US010209981B2

(12) United States Patent
Hirshberg et al.

(10) Patent No.: US 10,209,981 B2
(45) Date of Patent: Feb. 19, 2019

(54) STRUCTURE FOR UPDATING SOFTWARE IN REMOTE DEVICE

(71) Applicant: NIO USA, Inc., San Jose, CA (US)

(72) Inventors: Yanir Hirshberg, San Jose, CA (US); Craig North, Sunnyvale, CA (US)

(73) Assignee: NIO USA, Inc., San Jose, CA (US)

( * ) Notice: Subject to any disclaimer, the term of this patent is extended or adjusted under 35 U.S.C. 154(b) by 6 days.

(21) Appl. No.: 15/423,186

(22) Filed: Feb. 2, 2017

(65) Prior Publication Data
US 2018/0143818 A1 May 24, 2018

Related U.S. Application Data

(60) Provisional application No. 62/424,976, filed on Nov. 21, 2016.

(51) Int. Cl.
*G06F 8/61* (2018.01)
*G06F 8/65* (2018.01)
*G06F 11/14* (2006.01)

(52) U.S. Cl.
CPC ............ *G06F 8/65* (2013.01); *G06F 11/1433* (2013.01); *G06F 8/63* (2013.01)

(58) Field of Classification Search
None
See application file for complete search history.

(56) References Cited

U.S. PATENT DOCUMENTS

| 8,276,208 | B2 | 9/2012 | Morgan |
| 8,631,404 | B2 | 1/2014 | Laor |
| 8,943,489 | B1 | 1/2015 | Qu |
| 9,021,459 | B1 | 4/2015 | Qu |
| 9,804,901 | B2 | 10/2017 | Gambardella et al. |
| 2003/0095648 | A1* | 5/2003 | Kaib ............... A61B 5/0006 379/106.02 |
| 2008/0163189 | A1 | 7/2008 | Chen et al. |
| 2008/0168244 | A1* | 7/2008 | Chu Chen ............ G06F 11/1417 711/162 |

(Continued)

FOREIGN PATENT DOCUMENTS

WO   WO 2015/109804   7/2015

OTHER PUBLICATIONS

U.S. Appl. No. 15/484,469, filed Apr. 11, 2017, Hirshbreg.
U.S. Appl. No. 15/849,131, filed Dec. 20, 2017, Wang et al.
"Cisco IOS High Availability (HA)—Technical Overview," Cisco, 2006, retrieved from https://www.cisco.com/c/dam/en/us/products/collateral/ios-nx-os-software/high-availability/prod_presentation0900aecd80456cb8.pdf, 24 pages.

(Continued)

*Primary Examiner* — Daxin Wu
(74) *Attorney, Agent, or Firm* — Sheridan Ross P.C.

(57) ABSTRACT

According to one embodiment, updating software in a remote device comprises operating on a first image of an operating system code, updating to a second image of the operating system code, wherein updating to the second image comprises operating on the second image while maintaining the first image in memory, and in response to detecting an error in operating on the second image, operating on the first image of the operating system code maintained in the memory accessible by the ECU. Operating on the first image of the operating system code can comprise saving the first image in the memory and executing the first image based on a pointer to the first image. Updating can comprise saving the second image without overwriting or erasing the first image and executing the second image based on a pointer to the second image.

9 Claims, 7 Drawing Sheets

(56) References Cited

U.S. PATENT DOCUMENTS

| | | | |
|---|---|---|---|
| 2010/0146231 A1* | 6/2010 | Gopalan | G06F 11/1469 711/162 |
| 2013/0013877 A1 | 1/2013 | Tian | |
| 2014/0004825 A1* | 1/2014 | Prakash | H04W 12/06 455/411 |
| 2014/0137125 A1 | 5/2014 | Hsu | |
| 2014/0282470 A1 | 9/2014 | Buga et al. | |
| 2015/0095898 A1 | 4/2015 | Mitchell et al. | |
| 2015/0278046 A1 | 10/2015 | Zellermayer et al. | |
| 2015/0301821 A1 | 10/2015 | Danne et al. | |
| 2015/0355898 A1 | 12/2015 | Zhang et al. | |
| 2016/0210141 A1 | 7/2016 | Gunti et al. | |
| 2016/0210157 A1 | 7/2016 | Kim | |
| 2016/0291959 A1 | 10/2016 | Searle et al. | |
| 2016/0294605 A1 | 10/2016 | Searle et al. | |
| 2016/0335073 A1 | 11/2016 | Hong | |
| 2017/0180391 A1 | 6/2017 | Hinchliffe et al. | |
| 2018/0074842 A1 | 3/2018 | Fu et al. | |

OTHER PUBLICATIONS

"Cisco IOS in service software upgrade," Cisco, 2007, retrieved from https://www.cisco.com/c/en/us/td/docs/ios/12_2sb/feature/guide/sb_issu.html, 57 pages.

Pott, "VMware: We're gonna patent hot-swapping your VMs' host OS," The Register, 2016, retrieved from http://www.theregister.co.uk/2016/08/02/vmware_files_patent_os_hot_swaps/, 7 pages.

Sena, "Secure Over-the-Air-Vehicle Software Updates," International Telecommunication Union, 2015, 49 pages.

International Search Report and Written Opinion for International (PCT) Patent Application No. PCT/US17/62245, dated Jan. 29, 2018, 7 pages.

Bonomi, "The Smart and Connected Vehicle and the Internet of Things," Cisco Systems, 2013, 53 pages.

Official Action for U.S. Appl. No. 15/484,469, dated Nov. 1, 2018, 39 pages.

* cited by examiner

STRUCTURE FOR UPDATING SOFTWARE IN REMOTE DEVICE

CROSS REFERENCE TO RELATED APPLICATIONS

The present application claims the benefits of and priority, under 35 U.S.C. § 119(e), to U.S. Provisional Application Ser. No. 62/424,976, filed Nov. 21, 2016, entitled "Next Generation Vehicle." The entire disclosures of the applications listed above are hereby incorporated by reference, in their entirety, for all that they teach and for all purposes.

FIELD

The present disclosure is generally directed to vehicle systems, in particular, toward electric and/or hybrid-electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
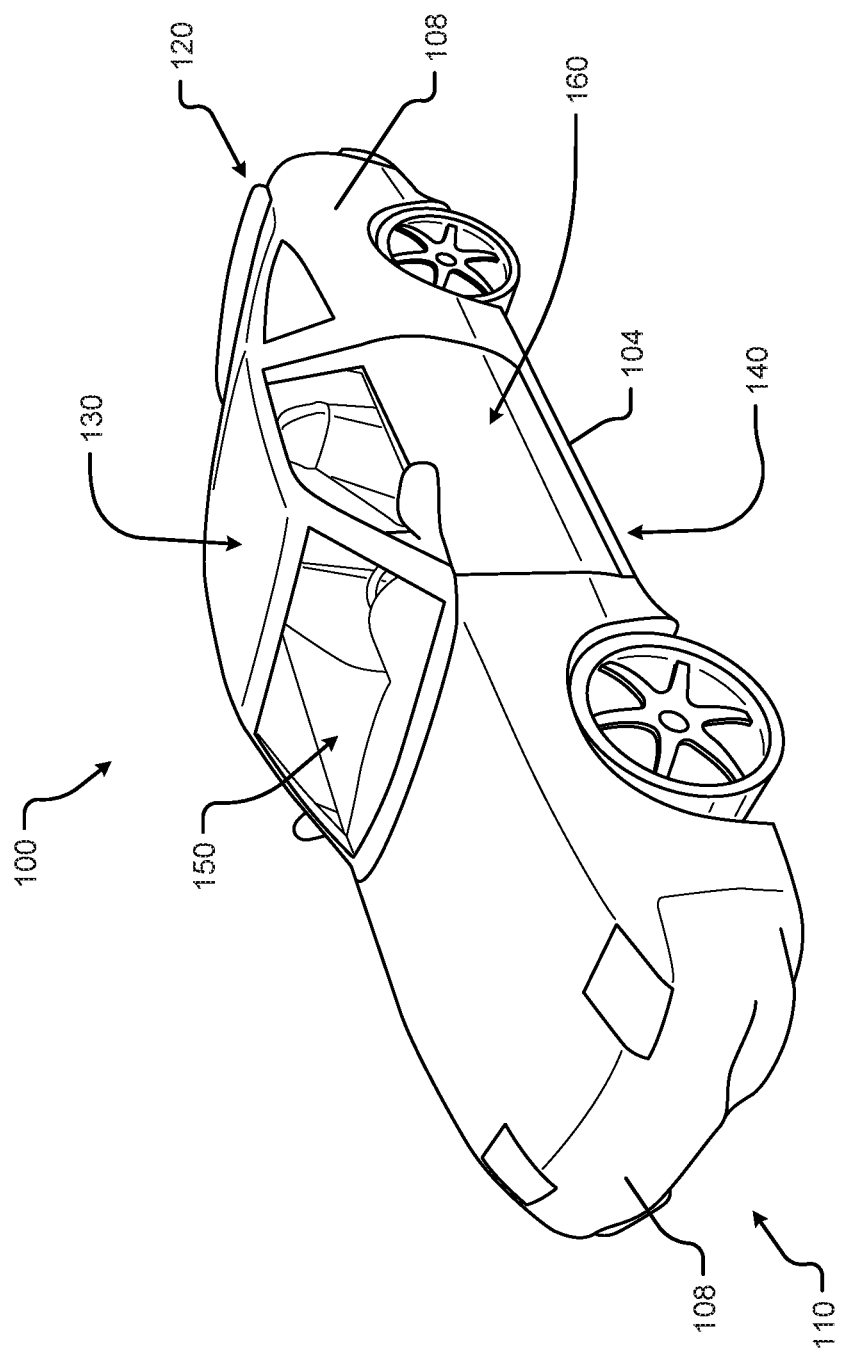
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2:
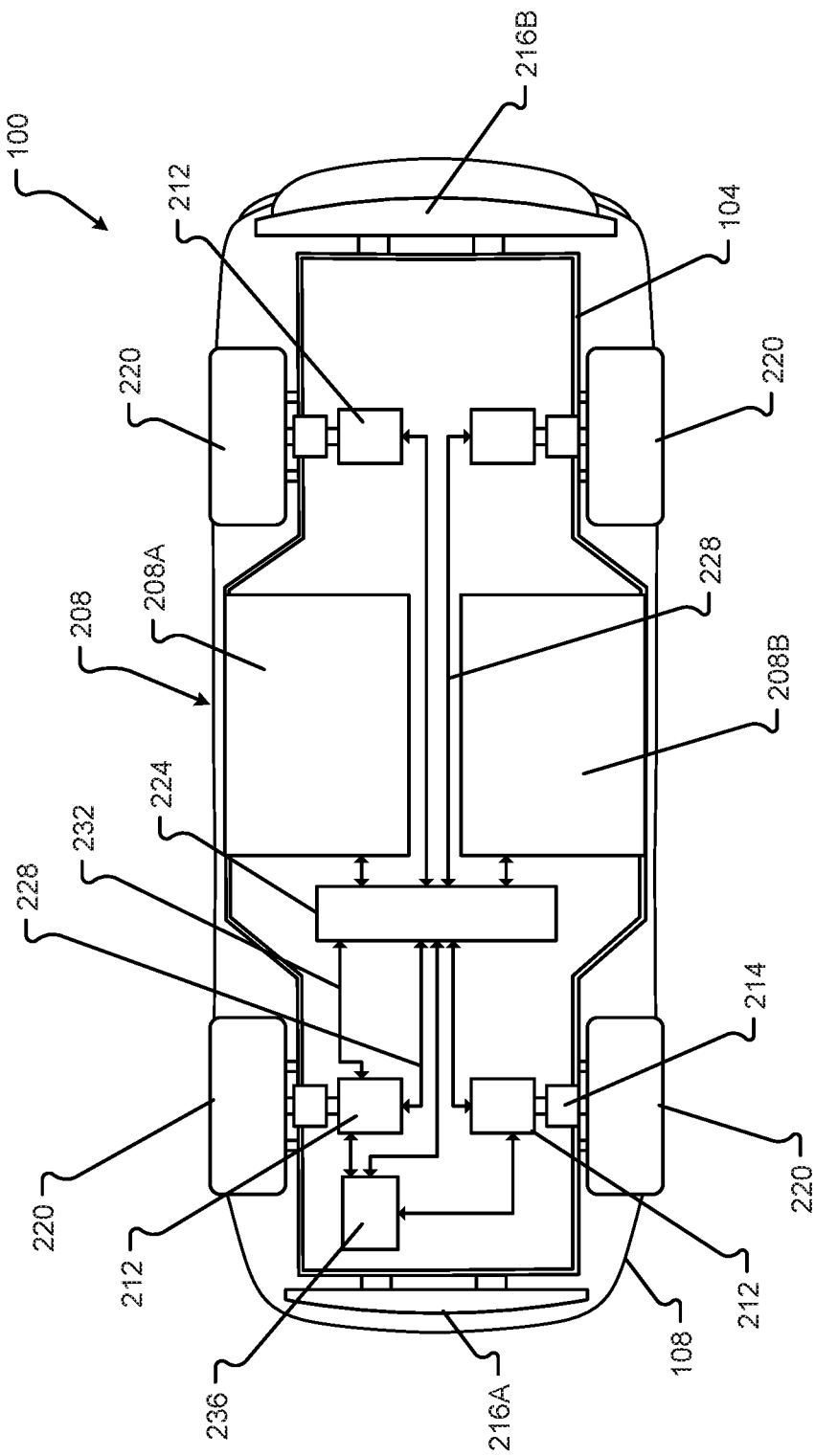
FIG. 2 shows a plan view of the vehicle in accordance with at least some embodiments of the present disclosure.

Referring now to FIG. 2, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 208A, 208B, motors 212, engines, safety equipment, controllers, user interfaces, interiors exterior components, body panels 108, bumpers 216, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used power source 208A, 208B (e.g., battery unit, capacitor unit, etc.) from the vehicle 100 and replace the used power source 208A, 208B with a charged or new power source. Continuing this example, the power source 208A, 208B may include selectively interchangeable features that interconnect with the frame 104 or other portion of the vehicle 100. For instance, in a power source 208A, 208B replacement, the quick release features may be configured to release the power source 208A, 208B from an engaged position and slide or move in a direction away from the frame 104 of a vehicle 100. Once removed, or separated from, the vehicle, the power source 208A, 208B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

In some embodiments, the frame 104 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured as electromagnetic mechanisms, mechanical couplings, electromechanical coupling mechanisms, etc., and/or combinations thereof. The features may be selectively deployed from a portion of the frame 104 and/or body of the vehicle 100. In some cases, the features may be built into the frame 104 and/or body of the vehicle 100. In any event, the features may deploy from an unexposed position to an exposed position or may be configured to selectively engage/disengage without requiring an exposure or deployment of the mechanism from the frame 104 and/or body of the vehicle 100. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 212 of the vehicle 100. The electric motors 212 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 220 that are driven by the one or more electric motors 212 and motor controllers 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers 214, and/or power controllers that can provide a controlled output of power to one or more of the drive wheels 220 of the vehicle 100. The power transmission components, power controllers, or motor controllers 214 may be controlled by at least one other vehicle controller or computer system as described herein.

As provided above, the powertrain of the vehicle 100 may include one or more power sources 208A, 208B. These one or more power sources 208A, 208B may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208A, 208B may provide power to various systems of the vehicle 100. For instance, a drive power source may be configured to provide the power for the one or more electric motors 212 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208A, 208B in this manner may provide a number of benefits over conventional vehicle systems. For example, separating the power sources 208A, 208B allow one power source 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208A, 208B is depleted, removed, or becomes otherwise inoperable.

In some embodiments, the drive power source may be separated into two or more cells, units, sources, and/or systems. By way of example, a vehicle 100 may include a first drive power source 208A and a second drive power source 208B. The first drive power source 208A may be operated independently from or in conjunction with the second drive power source 208B and vice versa. Continuing this example, the first drive power source 208A may be removed from a vehicle while a second drive power source 208B can be maintained in the vehicle 100 to provide drive power. This approach allows the vehicle 100 to significantly reduce weight (e.g., of the first drive power source 208A, etc.) and improve power consumption, even if only for a temporary period of time. In some cases, a vehicle 100 running low on power may automatically determine that pulling over to a rest area, emergency lane, and removing, or "dropping off," at least one power source 208A, 208B may reduce enough weight of the vehicle 100 to allow the vehicle 100 to navigate to the closest power source replacement and/or charging area. In some embodiments, the removed, or "dropped off," power source 208A may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a charge controller 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some embodiments, the charge controller 224 or the power source 208 may include a communication interface. The communication interface can allow the charge controller 224 to report a state of the power source 208 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 include one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 232 is being used and/or damage has occurred to a particular area of the vehicle electrical system. In any event, the one or more redundant electrical interconnections 232 may be configured along completely different routes than the electrical interconnections 228 and/or include different modes of failure than the electrical interconnections 228 to, among other things, prevent a total interruption power distribution in the event of a failure.

In some embodiments, the power distribution system may include an energy recovery system 236. This energy recovery system 236, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 236, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 208. For example, the recovered electrical energy may be used to charge the power source 208 of the vehicle 100.

The vehicle 100 may include one or more safety systems. Vehicle safety systems can include a variety of mechanical and/or electrical components including, but in no way limited to, low impact or energy-absorbing bumpers 216A, 216B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact.

Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 3:
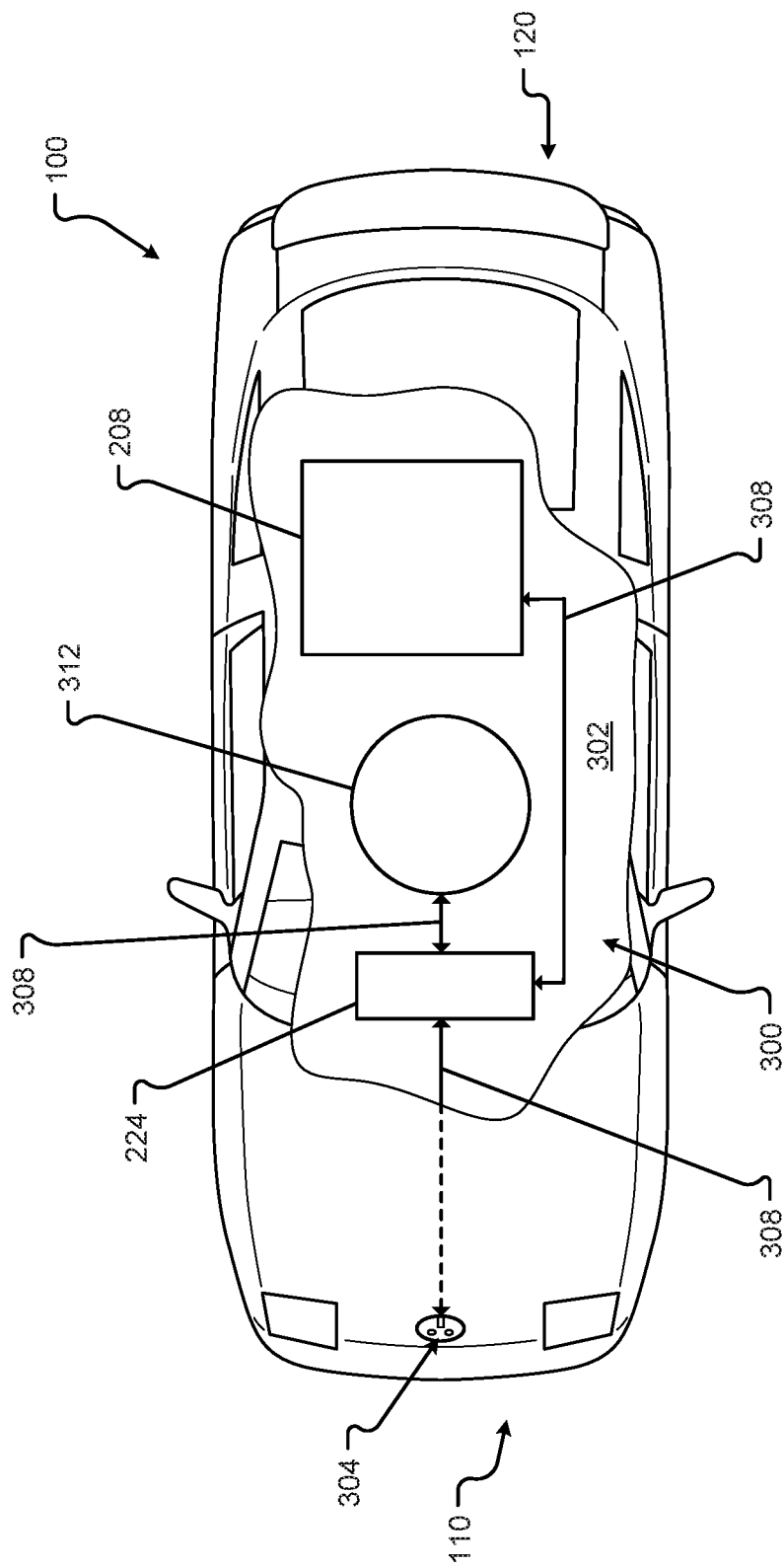
FIG. 3 shows a plan view of the vehicle in accordance with embodiments of the present disclosure.

FIG. 3 shows a plan view of the vehicle 100 in accordance with embodiments of the present disclosure. In particular, FIG. 3 shows a broken section 302 of a charging system 300 for the vehicle 100. The charging system 300 may include a plug or receptacle 304 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 304 may be transferred via at least one power transmission interconnection 308. Similar, if not identical, to the electrical interconnections 228 described above, the at least one power transmission interconnection 308 may be one or more cables, wires, traces, wireless power transmission systems, etc., and/or combinations thereof. Electrical energy in the form of charge can be transferred from the external power source to the charge controller 224. As provided above, the charge controller 224 may regulate the addition of charge to at least one power source 208 of the vehicle 100 (e.g., until the at least one power source 208 is full or at a capacity, etc.).

In some embodiments, the vehicle 100 may include an inductive charging system and inductive charger 312. The inductive charger 312 may be configured to receive electrical energy from an inductive power source external to the vehicle 100. In one embodiment, when the vehicle 100 and/or the inductive charger 312 is positioned over an inductive power source external to the vehicle 100, electrical energy can be transferred from the inductive power source to the vehicle 100. For example, the inductive charger 312 may receive the charge and transfer the charge via at least one power transmission interconnection 308 to the charge controller 324 and/or the power source 208 of the vehicle 100. The inductive charger 312 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some embodiments, the inductive charger 312 may be configured to receive charge only when the inductive charger 312 is deployed from the vehicle 100. In other embodiments, the inductive charger 312 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
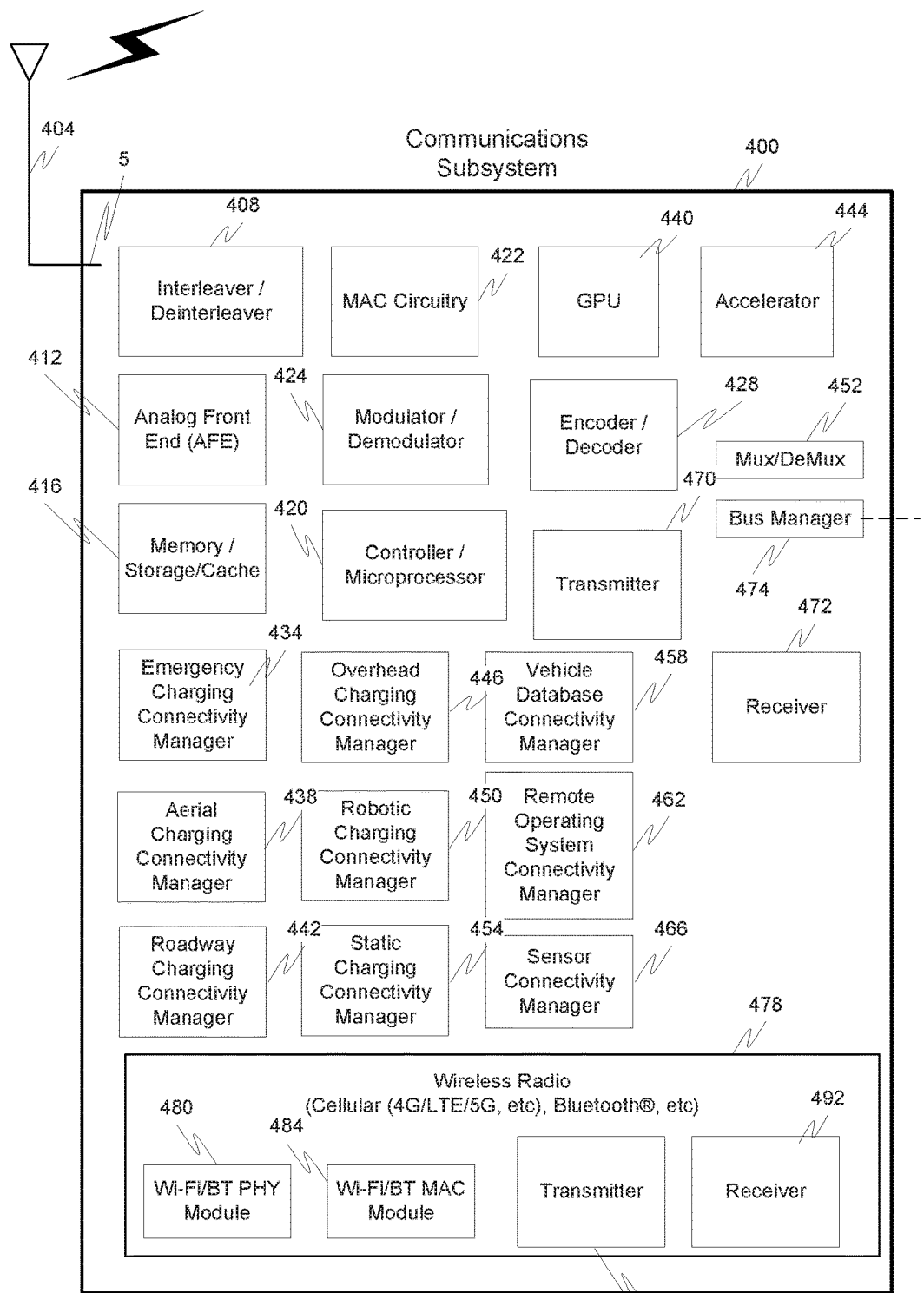
FIG. 4 is a block diagram of an embodiment of a communications subsystem of the vehicle.

FIG. 4 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem can include one or more communications links (that can be wired or wireless) and/or communications busses (managed by the bus manager 474), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem enables communications between any if the inter-vehicle systems and subsystems as well as communications with non-collocated resources, such as those reachable over a network such as the Internet.

The communications subsystem 400, in addition to well-known componentry (which has been omitted for clarity), includes interconnected elements including one or more of: one or more antennas 404, an interleaver/deinterleaver 408, an analog front end (AFE) 412, memory/storage/cache 416, controller/microprocessor 420, MAC circuitry 422, modulator/demodulator 424, encoder/decoder 428, a plurality of connectivity managers 434-466, GPU 440, accelerator 444, a multiplexer/demultiplexer 452, transmitter 470, receiver 472 and wireless radio 478 components such as a Wi-Fi PHY/Bluetooth® module 480, a Wi-Fi/BT MAC module 484, transmitter 488 and receiver 492. The various elements in the device 400 are connected by one or more links/busses 5 (not shown, again for sake of clarity).

The device 400 can have one more antennas 404, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 404 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 404 generally interact with the Analog Front End (AFE) 412, which is needed to enable the correct processing of the received modulated signal and signal conditioning for a transmitted signal. The AFE 412 can be functionally located between the antenna and a digital baseband system in order to convert the analog signal into a digital signal for processing and vice-versa.

The subsystem 400 can also include a controller/microprocessor 420 and a memory/storage/cache 416. The subsystem 400 can interact with the memory/storage/cache 416 which may store information and operations necessary for configuring and transmitting or receiving the information described herein. The memory/storage/cache 416 may also be used in connection with the execution of application programming or instructions by the controller/microprocessor 420, and for temporary or long term storage of program instructions and/or data. As examples, the memory/storage/cache 420 may comprise a computer-readable device, RAM, ROM, DRAM, SDRAM, and/or other storage device(s) and media.

The controller/microprocessor 420 may comprise a general purpose programmable processor or controller for executing application programming or instructions related to the subsystem 400. Furthermore, the controller/microprocessor 420 can perform operations for configuring and transmitting/receiving information as described herein. The controller/microprocessor 420 may include multiple processor cores, and/or implement multiple virtual processors. Optionally, the controller/microprocessor 420 may include multiple physical processors. By way of example, the controller/microprocessor 420 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 400 can further include a transmitter 470 and receiver 472 which can transmit and receive signals, respectively, to and from other devices, subsystems and/or other destinations using the one or more antennas 404 and/or links/busses. Included in the subsystem 400 circuitry is the medium access control or MAC Circuitry 422. MAC circuitry 422 provides for controlling access to the wireless medium. In an exemplary embodiment, the MAC circuitry 422 may be arranged to contend for the wireless medium and configure frames or packets for communicating over the wired/wireless medium.

The subsystem 400 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 400 also includes a GPU 440, an accelerator 444, a Wi-Fi/BT/BLE PHY module 480 and a Wi-Fi/BT/BLE MAC module 484 and wireless transmitter 488 and receiver 492. In some embodiments, the GPU 440 may be a graphics processing unit, or visual processing unit, comprising at least one circuit and/or chip that manipulates and changes memory to accelerate the creation of images in a frame buffer for output to at least one display device. The GPU 440 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 434-466 (even) manage and/or coordinate communications between the subsystem 400 and one or more of the systems disclosed herein and one or more other devices/systems. The connectivity managers include an emergency charging connectivity manager 434, an aerial charging connectivity manager 438, a roadway charging connectivity manager 442, an overhead charging connectivity manager 446, a robotic charging connectivity manager 450, a static charging connectivity manager 454, a vehicle database connectivity manager 458, a remote operating system connectivity manager 462 and a sensor connectivity manager 466.

The emergency charging connectivity manager 434 can coordinate not only the physical connectivity between the vehicle 100 and the emergency charging device/vehicle, but can also communicate with one or more of the power management controller, one or more third parties and optionally a billing system(s). As an example, the vehicle 100 can establish communications with the emergency charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the emergency charging connectivity manager 434 can also communicate information, such as billing information to the emergency charging vehicle and/or a third party. This billing information could be, for example, the owner of the vehicle, the driver/occupant(s) of the vehicle, company information, or in general any information usable to charge the appropriate entity for the power received.

The aerial charging connectivity manager 438 can coordinate not only the physical connectivity between the vehicle 100 and the aerial charging device/vehicle, but can also communicate with one or more of the power management controller, one or more third parties and optionally a billing system(s). As an example, the vehicle 100 can establish communications with the aerial charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the aerial charging connectivity manager 438 can similarly communicate information, such as billing information to the aerial charging vehicle and/or a third party. This billing information could be, for example, the owner of the vehicle 100, the driver/occupant(s) of the vehicle 100, company information, or in general any information usable to charge the appropriate entity for the power received etc., as discussed.

The roadway charging connectivity manager 442 and overhead charging connectivity manager 446 can coordinate not only the physical connectivity between the vehicle 100 and the charging device/system, but can also communicate with one or more of the power management controller, one or more third parties and optionally a billing system(s). As one example, the vehicle 100 can request a charge from the charging system when, for example, the vehicle 100 needs or is predicted to need power. As an example, the vehicle 100 can establish communications with the charging device/vehicle to one or more of coordinate interconnectivity between the two for charging and share information for billing. Once charging is complete, the amount of charge provided can be tracked and optionally forwarded to, for example, a third party for billing. This billing information could be, for example, the owner of the vehicle 100, the driver/occupant(s) of the vehicle 100, company information, or in general any information usable to charge the appropriate entity for the power received etc., as discussed. The person responsible for paying for the charge could also receive a copy of the billing information as is customary. The robotic charging connectivity manager 450 and static charging connectivity manager 454 can operate in a similar manner to that described herein.

The vehicle database connectivity manager 458 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general any information stored in the vehicle database can optionally be shared with any one or more other devices optionally subject to any privacy or confidentially restrictions.

The remote operating system connectivity manager 462 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 466 facilitates communications between any one or more of the vehicle sensors and any one or more of the other vehicle systems. The sensor connectivity manager 466 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 5:
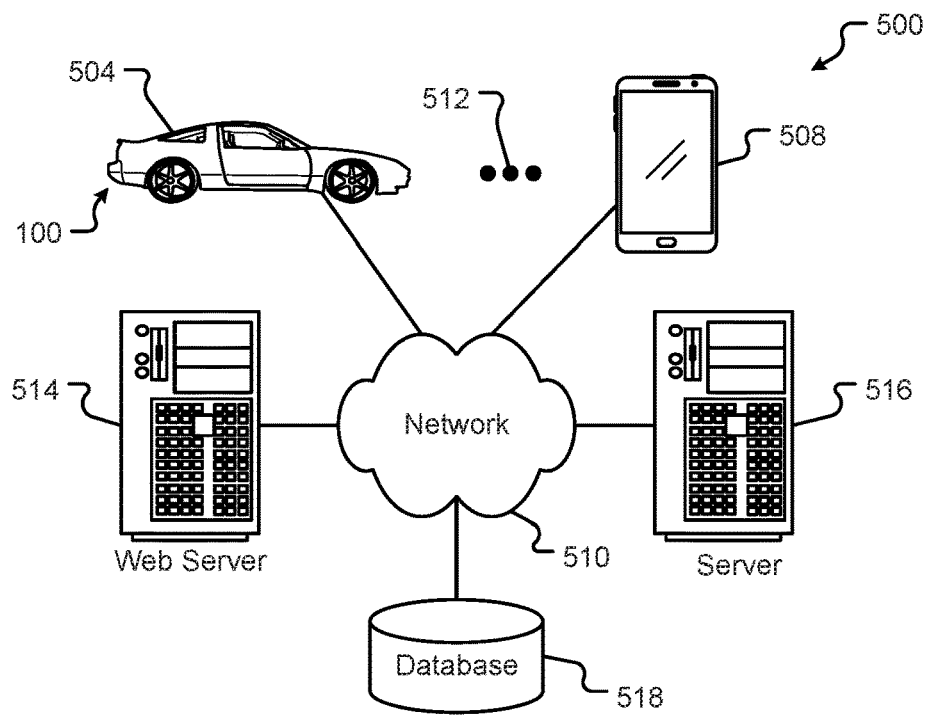
FIG. 5 is a block diagram of a computing environment associated with the embodiments presented herein.

FIG. 5 illustrates a block diagram of a computing environment 500 that may function as the servers, user computers, or other systems provided and described herein. The environment 500 includes one or more user computers, or computing devices, such as a vehicle computing device 504, a communication device 508, and/or more 512. The computing devices 504, 508, 512 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 504, 508, 512 may also have any of a variety of applications, including for example, database client and/or server applications, and web browser applications. Alternatively, the computing devices 504, 508, 512 may be any other electronic device, such as a thin-client computer, Internet-enabled mobile telephone, and/or personal digital assistant, capable of communicating via a network 510 and/or displaying and navigating web pages or other types of electronic documents. Although the exemplary computer environment 500 is shown with two computing devices, any number of user computers or computing devices may be supported.

Environment 500 further includes a network 510. The network 510 may can be any type of network familiar to those skilled in the art that can support data communications using any of a variety of commercially-available protocols, including without limitation SIP, TCP/IP, SNA, IPX, Apple-Talk, and the like. Merely by way of example, the network 510 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 514, 516. In this example, server 514 is shown as a web server and server 516 is shown as an application server. The web server 514, which may be used to process requests for web pages or other electronic documents from computing devices 504, 508, 512. The web server 514 can be running an operating system including any of those discussed above, as well as any commercially-available server operating systems. The web server 514 can also run a variety of server applications, including SIP (Session Initiation Protocol) servers, HTTP(s) servers, FTP servers, CGI servers, database servers, Java servers, and the like. In some instances, the web server 514 may publish operations available operations as one or more web services.

The environment 500 may also include one or more file and or/application servers 516, which can, in addition to an operating system, include one or more applications accessible by a client running on one or more of the computing devices 504, 508, 512. The server(s) 516 and/or 514 may be one or more general purpose computers capable of executing programs or scripts in response to the computing devices 504, 508, 512. As one example, the server 516, 514 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 516 may also include database servers, including without limitation those commercially available from Oracle®, Microsoft®, Sybase®, IBM® and the like, which can process requests from database clients running on a computing device 504, 508, 512.

The web pages created by the server 514 and/or 516 may be forwarded to a computing device 504, 508, 512 via a web (file) server 514, 516. Similarly, the web server 514 may be able to receive web page requests, web services invocations, and/or input data from a computing device 504, 508, 512 (e.g., a user computer, etc.) and can forward the web page requests and/or input data to the web (application) server 516. In further embodiments, the server 516 may function as a file server. Although for ease of description, FIG. 5 illustrates a separate web server 514 and file/application server 516, those skilled in the art will recognize that the functions described with respect to servers 514, 516 may be performed by a single server and/or a plurality of specialized servers, depending on implementation-specific needs and parameters. The computer systems 504, 508, 512, web (file) server 514 and/or web (application) server 516 may function as the system, devices, or components described in FIGS. 1-5.

The environment 500 may also include a database 518. The database 518 may reside in a variety of locations. By way of example, database 518 may reside on a storage medium local to (and/or resident in) one or more of the computers 504, 508, 512, 514, 516. Alternatively, it may be remote from any or all of the computers 504, 508, 512, 514, 516, and in communication (e.g., via the network 510) with one or more of these. The database 518 may reside in a storage-area network ("SAN") familiar to those skilled in the art. Similarly, any necessary files for performing the functions attributed to the computers 504, 508, 512, 514, 516 may be stored locally on the respective computer and/or remotely, as appropriate. The database 518 may be a relational database, such as Oracle 20i®, that is adapted to store, update, and retrieve data in response to SQL-formatted commands.

Figure 6:
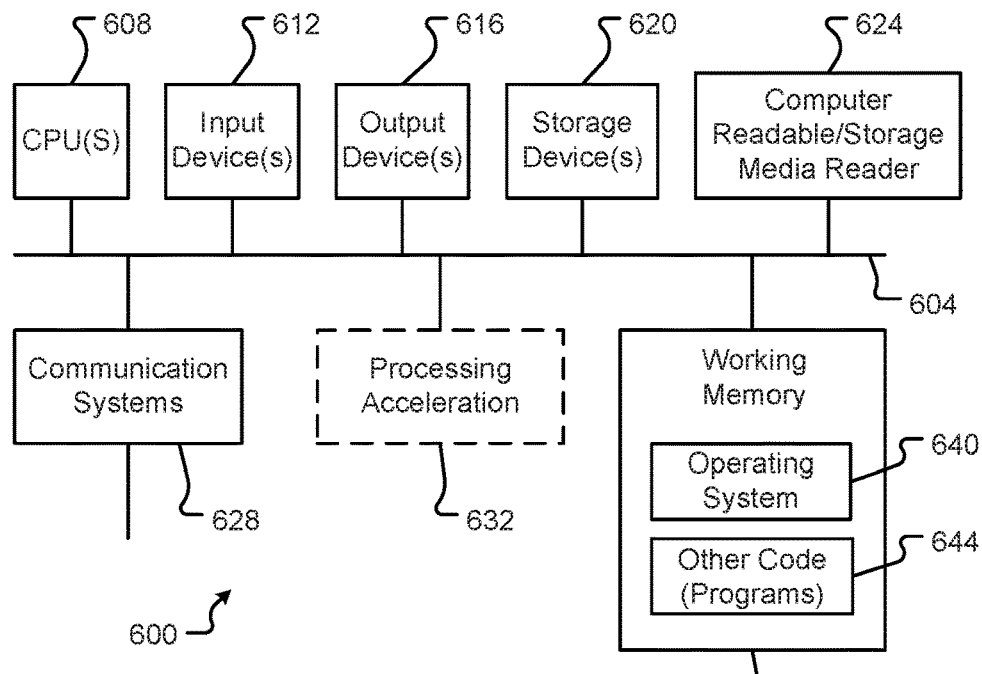
FIG. 6 is a block diagram of a computing device associated with one or more components described herein.

FIG. 6 illustrates one embodiment of a computer system 600 upon which the servers, user computers, computing devices, or other systems or components described above may be deployed or executed. The computer system 600 is shown comprising hardware elements that may be electrically coupled via a bus 604. The hardware elements may include one or more central processing units (CPUs) 608; one or more input devices 612 (e.g., a mouse, a keyboard, etc.); and one or more output devices 616 (e.g., a display device, a printer, etc.). The computer system 600 may also include one or more storage devices 620. By way of example, storage device(s) 620 may be disk drives, optical storage devices, solid-state storage devices such as a random access memory ("RAM") and/or a read-only memory ("ROM"), which can be programmable, flash-updateable and/or the like.

The computer system 600 may additionally include a computer-readable storage media reader 624; a communications system 628 (e.g., a modem, a network card (wireless or wired), an infra-red communication device, etc.); and working memory 636, which may include RAM and ROM devices as described above. The computer system 600 may also include a processing acceleration unit 632, which can include a DSP, a special-purpose processor, and/or the like.

The computer-readable storage media reader 624 can further be connected to a computer-readable storage medium, together (and, optionally, in combination with storage device(s) 620) comprehensively representing remote, local, fixed, and/or removable storage devices plus storage media for temporarily and/or more permanently containing computer-readable information. The communications system 628 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 600 may also comprise software elements, shown as being currently located within a working memory 636, including an operating system 640 and/or other code 644. It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 608 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 7:
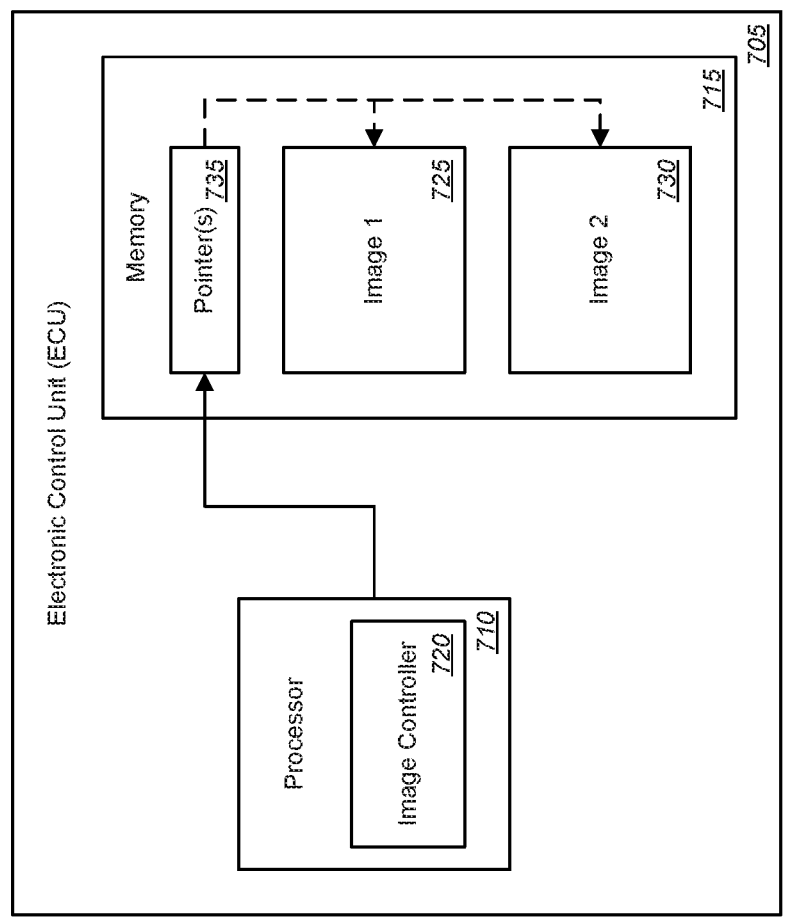
FIG. 7 is a block diagram illustrating an exemplary remote device in which software can be updated according to one embodiment of the present disclosure.

FIG. 7 is a block diagram illustrating an exemplary remote device in which software can be updated according to one embodiment of the present disclosure. More specifically, this example illustrates an Electronic Control Unit (ECU) 705 such as a controller for any one or more of the systems or components of a vehicle as described above. The ECU 705 can comprise a processor 710 and a memory 715 coupled with and readable by the processor 710. The processor 710 can execute a set of instructions, e.g., implementing an image controller application 720, to manage software updates of the ECU 705 such as the operating system code used by the ECU 705.

According to one embodiment, updating software in a remote device, such as the ECU 705, can comprise operating on a first image 725 of an operating system code. Operating on the first image 725 of the operating system code can comprise saving the first image 725 in the memory 715 of the ECU 705 and setting, e.g., by the image controller application 720, a pointer 735 to the first image 725 saved in the memory 715. This pointer 735 may be stored, for example, in a vector table used by the processor 710 of the ECU 705. In another example, this pointer 735 may be stored at a fixed address in the memory 715 of the ECU 705 that the processor 710 uses to startup or boot from. In some cases, once the pointer 735 has been set, the ECU 705 may be reset or restarted. The processor 710 can then execute the first image 725 based on the set pointer 735 to the first image 725.

At some point in time, the operating system code of the ECU 705 may be updated, i.e., to a new, second image 730. For example, this update to the second image 730 can comprise performing an OTA update of the operating system code of the ECU 705. In other cases, the update may be performed through a wired connection, e.g., through the OBD port or other connection to the vehicle. In either case, updating to the second image 730 can comprise operating on the second image 730 while maintaining the first image 725 in memory 715. Operating on the second image 730 can comprise saving the second image 730 in the memory 715 of the ECU 705 without overwriting or erasing the first image 725 and setting a pointer 735 to the second image 730 saved in the memory 715 while maintaining, e.g., by the image controller application 720, a pointer to the first image 725. As noted above, the pointers may be stored, for example, in a vector table used by the processor 710 of the ECU 705. In another example, the pointer 735 to the second image 730 may be stored at a fixed address in the memory 715 that the processor 710 uses to startup or boot from while the pointer to the first image 725 can be retained by the image controller application 720 at another known location in the memory 715 available for retrieval and use by the image controller application 720. In some cases, once the pointer 735 has been set, the ECU 705 may be reset or restarted. The processor 710 can then execute the second image 730 based on the set pointer 735 to the second image 730.

At some point during operation of the ECU 705 using the updated, second image 730, an error may occur. However, since the earlier, first image 725 is still available in memory 715 and pointer to that image has been saved by the image controller application 720, that first image 725 can be used as a backup or replacement for the faulty second image 730. Therefore, in response to detecting an error in operating on the second image 730, the image controller application 720 can switch the processor 710 to operate on the first image 725 of the operating system code maintained in the memory 715. Operating on the first image 725 of the operating system code maintained in the memory 715 can comprise setting, by the image controller application 720, a pointer 735 to the first image 725 based on the previously saved and maintained pointer to the first image 725 and then executing, by the processor 710, the first image 725 in place of the second image 730 based on the set pointer 735 to the first image 725. Depending upon how the pointers are stored, setting the pointer 735 to the first image 725 can comprise updating the vector table, writing the stored pointer to the first image to the address used to bootstrap the processor 710 of the ECU 705, etc. In some cases, the ECU 705 may be reset to affect this change.

Figure 8:
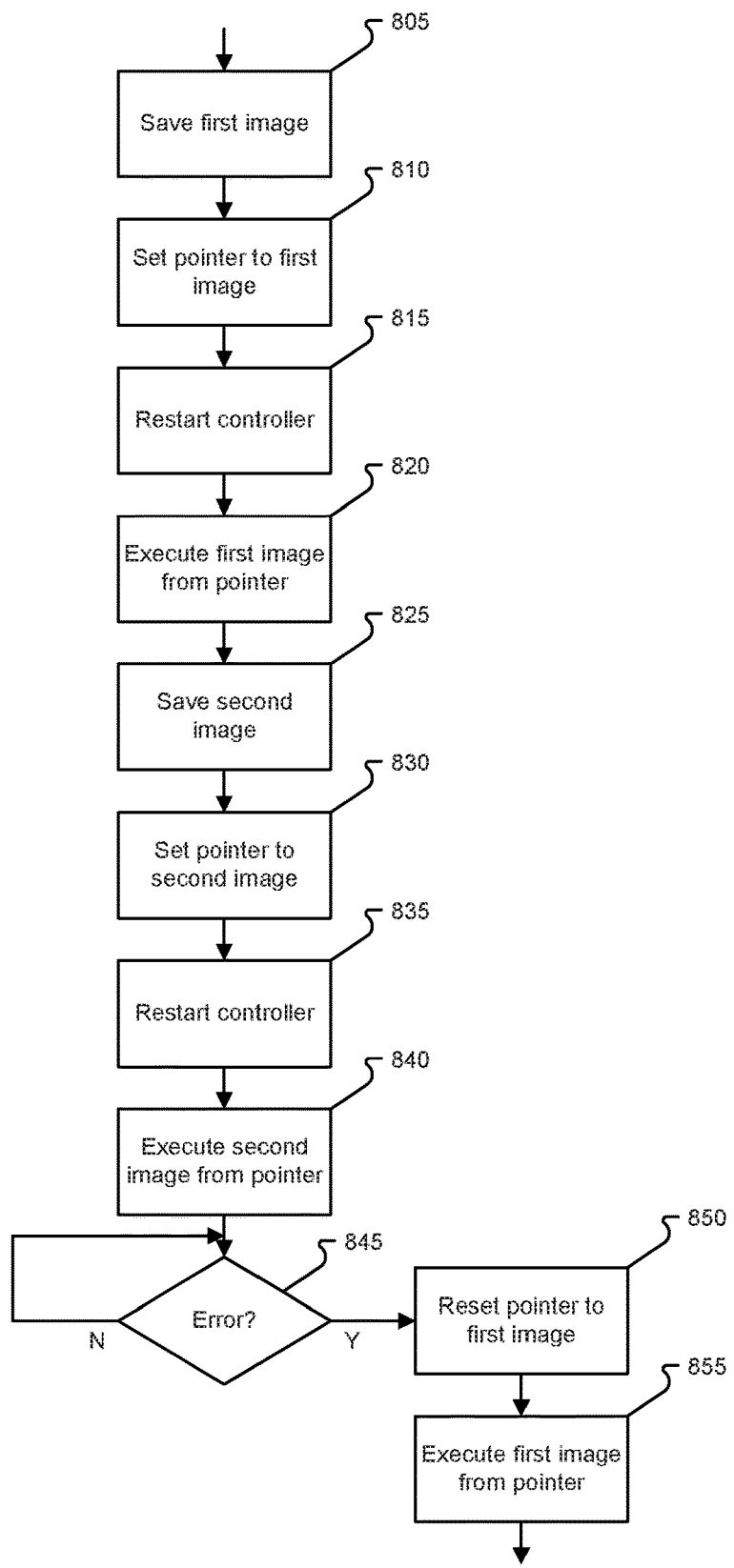
FIG. 8 is a flowchart illustrating an exemplary process for updating software in a remote device according to one embodiment of the present disclosure.

FIG. 8 is a flowchart illustrating an exemplary process for updating software in a remote device according to one embodiment of the present disclosure. As illustrated in this example, updating software in a remote device, such as an ECU for a component or system of a vehicle, can comprise operating on a first image of an operating system code. Operating on the first image of the operating system code can comprise saving 805 the first image in the memory accessible by the ECU and setting 810 a pointer to the first image saved in the memory. This pointer may be stored, for example, in a vector table used by the processor of the ECU. In another example, this pointer may be stored at a fixed address in the memory of the ECU that the processor uses to startup or boot from. In some cases, once the pointer has been set 810, the ECU may be reset or restarted 815. The ECU can then execute 820 the first image based on the set pointer to the first image.

At some point in time, the operating system code of the ECU may be updated, i.e., to a new, second image. For example, this update to the second image can comprise performing an OTA update of the operating system code of the ECU. In other cases, the update may be performed through a wired connection, e.g., through the OBD port or other connection to the vehicle. In either case, updating to the second image can comprise operating on the second image while maintaining the first image in memory accessible by the ECU. Operating on the second image can comprise saving 825 the second image in the memory accessible by the ECU without overwriting or erasing the first image and setting 830 a pointer to the second image saved in the memory while maintaining a pointer to the first image. As noted above, the pointers may be stored, for example, in a vector table used by the processor of the ECU. In another example, the pointer to the second image may be stored at a fixed address in the memory of the ECU that the processor uses to startup or boot from while the pointer to the first image is retained at another known location in the memory available for retrieval and use. In some cases, once the pointer has been set 830, the ECU may be reset or restarted 835. The ECU can then execute 840 the second image based on the set pointer to the second image.

At some point during operation of the ECU using the updated, second image, an error may occur. However, since the earlier, first image is still available in memory and pointer to that image has been saved, that image can be used as a backup or replacement for the faulty second image. Therefore, in response to detecting 845 an error in operating on the second image, the ECU can switch to operate on the first image of the operating system code maintained in the memory accessible by the ECU. Operating on the first image of the operating system code maintained in the memory accessible by the ECU can comprise setting 850 a pointer to the first image based on the maintained pointer to the first image and executing 855 the first image based on the set pointer to the first image. Depending upon how the pointers are stored, setting the pointer to the first image can comprise updating the vector table, writing the stored pointer to the first image to the address used to bootstrap the processor of the ECU, etc. In some cases, the ECU may be reset to affect this change.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method for updating software in a remote device, the method comprising: operating, by an Electronic Control Unit (ECU), on a first image of an operating system code; updating, by the ECU, to a second image of the operating system code, wherein updating to the second image comprises operating, by the ECU, on the second image while maintaining the first image in memory accessible by the ECU; and in response to detecting an error in operating on the second image, operating, by the ECU, on the first image of the operating system code maintained in the memory accessible by the ECU.

Aspects of the above method include wherein operating on the first image of the operating system code comprises: saving, by the ECU, the first image in the memory accessible by the ECU; setting, by the ECU, a pointer to the first image saved in the memory; and executing, by the ECU, the first image based on the set pointer to the first image.

Aspects of the above method include wherein updating to the second image of the operating system code comprises: saving, by the ECU, the second image in the memory accessible by the ECU without overwriting or erasing the first image; setting, by the ECU, a pointer to the second image saved in the memory while maintaining a pointer to the first image; and executing, by the ECU, the second image based on the set pointer to the second image.

Aspects of the above method include wherein the pointer to the first image and the pointer to the second image are stored in a vector table in the memory accessible by the ECU.

Aspects of the above method include wherein operating on the first image of the operating system code maintained in the memory accessible by the ECU in response to detecting an error in operating on the second image comprises: setting, by the ECU, a pointer to the first image based on the maintained pointer to the first image; and executing, by the ECU, the first image based on the set pointer to the first image.

Aspects of the above method include wherein the ECU comprises an ECU for a component or system of a vehicle.

Aspects of the above method include wherein updating to the second image comprises performing an Over-The-Air (OTA) update of the operating system code of the ECU.

Embodiments include an Electronic Control Unit (ECU) comprising: a processor; and a memory coupled with and readable by the processor and storing therein a set of instructions which, when executed by the processor, causes the processor to update software in the ECU by: operating, by the processor, on a first image of an operating system code; updating, by the processor, to a second image of the operating system code, wherein updating to the second image comprises operating, by the processor, on the second image while maintaining the first image in the memory; and in response to detecting an error in operating on the second image, operating, by the processor, on the first image of the operating system code maintained in the memory.

Aspects of the above ECU include wherein operating on the first image of the operating system code comprises: saving, by the processor, the first image in the memory; setting, by the processor, a pointer to the first image saved in the memory; and executing, by the processor, the first image based on the set pointer to the first image.

Aspects of the above ECU include wherein updating to the second image of the operating system code comprises: saving, by the processor, the second image in the memory without overwriting or erasing the first image; setting, by the processor, a pointer to the second image while maintaining a pointer to the first image; and executing, by the processor, the second image based on the set pointer to the second image.

Aspects of the above ECU include wherein the pointer to the first image and the pointer to the second image are stored in a vector table in the memory.

Aspects of the above ECU include wherein operating on the first image of the operating system code maintained in the memory accessible by the ECU in response to detecting an error in operating on the second image comprises: setting, by the processor, a pointer to the first image based on the maintained pointer to the first image; and executing, by the processor, the first image based on the set pointer to the first image.

Aspects of the above ECU include wherein the ECU comprises an ECU for a component or system of a vehicle.

Aspects of the above ECU include wherein updating to the second image comprises performing an Over-The-Air (OTA) update of the operating system code of the ECU.

Embodiments include a non-transitory computer-readable medium comprising a set of instructions stored therein which, when executed by a processor, causes the processor to perform a software update by: operating, by an Electronic Control Unit (ECU), on a first image of an operating system code; updating, by the ECU, to a second image of the operating system code, wherein updating to the second image comprises operating, by the ECU, on the second image while maintaining the first image in memory accessible by the ECU; and in response to detecting an error in operating on the second image, operating, by the ECU, on the first image of the operating system code maintained in the memory accessible by the ECU.

Aspects of the above non-transitory computer-readable medium include wherein operating on the first image of the operating system code comprises: saving, by the ECU, the first image in the memory accessible by the ECU; setting, by the ECU, a pointer to the first image saved in the memory; and executing, by the ECU, the first image based on the set pointer to the first image.

Aspects of the above non-transitory computer-readable medium include wherein updating to the second image of the operating system code comprises: saving, by the ECU, the second image in the memory accessible by the ECU without overwriting or erasing the first image; setting, by the ECU, a pointer to the second image saved in the memory while maintaining a pointer to the first image; and executing, by the ECU, the second image based on the set pointer to the second image.

Aspects of the above non-transitory computer-readable medium include wherein the pointer to the first image and the pointer to the second image are stored in a vector table in the memory accessible by the ECU.

Aspects of the above non-transitory computer-readable medium include wherein operating on the first image of the operating system code maintained in the memory accessible by the ECU in response to detecting an error in operating on the second image comprises: setting, by the ECU, a pointer to the first image based on the maintained pointer to the first image; and executing, by the ECU, the first image based on the set pointer to the first image.

Aspects of the above non-transitory computer-readable medium include wherein the ECU comprises an ECU for a component or system of a vehicle and wherein updating to the second image comprises performing an Over-The-Air (OTA) update of the operating system code of the ECU.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A method for updating software in a remote device, the method comprising:
   operating, by an Electronic Control Unit (ECU), on a first image of an operating system code;
   updating, by the ECU, to a second image of the operating system code, wherein updating to the second image comprises operating, by the ECU, on the second image while maintaining the first image in memory accessible by the ECU; and
   in response to detecting an error in operating on the second image, operating, by the ECU, on the first image of the operating system code maintained in the memory accessible by the ECU,
   wherein operating on the first image of the operating system code comprises:
      saving, by the ECU, the first image in the memory accessible by the ECU;
      setting, by the ECU, a pointer to the first image saved in the memory; and
      executing, by the ECU, the first image based on the set pointer to the first image,
   wherein updating to the second image of the operating system code comprises:
      saving, by the ECU, the second image in the memory accessible by the ECU without overwriting or erasing the first image;
      setting, by the ECU, a pointer to the second image saved in the memory while maintaining the set pointer to the first image; and
      executing, by the ECU, the second image based on the set pointer to the second image,
   wherein operating on the first image of the operating system code maintained in the memory accessible by the ECU in response to detecting an error in operating on the second image comprises:
      setting, by the ECU, another pointer to the first image based on the maintained set pointer to the first image; and
      executing, by the ECU, the first image based on the set another pointer to the first image, and
   wherein the ECU comprises an ECU for a component of a vehicle or a system of the vehicle.

2. The method of claim 1, wherein the pointer to the first image and the pointer to the second image are stored in a vector table in the memory accessible by the ECU.

3. The method of claim 1, wherein updating to the second image comprises performing an Over-The-Air (OTA) update of the operating system code of the ECU.

4. An Electronic Control Unit (ECU) comprising:
   a processor; and
   a memory coupled with and readable by the processor and storing therein a set of instructions which, when executed by the processor, causes the processor to update software in the ECU by:
      operating, by the processor, on a first image of an operating system code;
      updating, by the processor, to a second image of the operating system code, wherein updating to the second image comprises operating, by the processor, on the second image while maintaining the first image in the memory; and
      in response to detecting an error in operating on the second image, operating, by the processor, on the first image of the operating system code maintained in the memory,
   wherein operating on the first image of the operating system code comprises:
      saving, by the ECU, the first image in the memory accessible by the ECU;
      setting, by the ECU, a pointer to the first image saved in the memory; and
      executing, by the ECU, the first image based on the set pointer to the first image,
   wherein updating to the second image of the operating system code comprises:
      saving, by the ECU, the second image in the memory accessible by the ECU without overwriting or erasing the first image;
      setting, by the ECU, a pointer to the second image saved in the memory while maintaining the set pointer to the first image; and
      executing, by the ECU, the second image based on the set pointer to the second image,
   wherein operating on the first image of the operating system code maintained in the memory accessible by the ECU in response to detecting an error in operating on the second image comprises:
      setting, by the ECU, another pointer to the first image based on the maintained set pointer to the first image; and
      executing, by the ECU, the first image based on the set another pointer to the first image, and
   wherein the ECU comprises an ECU for a component of a vehicle or a system of the vehicle.

5. The ECU of claim 4, wherein the pointer to the first image and the pointer to the second image are stored in a vector table in the memory.

6. The ECU of claim 4, wherein updating to the second image comprises performing an Over-The-Air (OTA) update of the operating system code of the ECU.

7. A non-transitory computer-readable medium comprising a set of instructions stored therein which, when executed by a processor, causes the processor to perform a software update by:
   operating, by an Electronic Control Unit (ECU), on a first image of an operating system code;
   updating, by the ECU, to a second image of the operating system code, wherein updating to the second image comprises operating, by the ECU, on the second image while maintaining the first image in memory accessible by the ECU; and
   in response to detecting an error in operating on the second image, operating, by the ECU, on the first image of the operating system code maintained in the memory accessible by the ECU,
   wherein operating on the first image of the operating system code comprises:
      saving, by the ECU, the first image in the memory accessible by the ECU;
      setting, by the ECU, a pointer to the first image saved in the memory; and
      executing, by the ECU, the first image based on the set pointer to the first image,
   wherein updating to the second image of the operating system code comprises:

saving, by the ECU, the second image in the memory accessible by the ECU without overwriting or erasing the first image;

setting, by the ECU, a pointer to the second image saved in the memory while maintaining the set pointer to the first image; and executing, by the ECU, the second image based on the set pointer to the second image, wherein operating on the first image of the operating system code maintained in the memory accessible by the ECU in response to detecting an error in operating on the second image comprises:

setting, by the ECU, another pointer to the first image based on the maintained set pointer to the first image; and executing, by the ECU, the first image based on the set another pointer to the first image, and wherein the ECU comprises an ECU for a component of a vehicle or a system of the vehicle.

8. The non-transitory computer-readable medium of claim 7, wherein the pointer to the first image and the pointer to the second image are stored in a vector table in the memory accessible by the ECU.

9. The non-transitory computer-readable medium of claim 7, wherein updating to the second image comprises performing an Over-The-Air (OTA) update of the operating system code of the ECU.

* * * * *